(12) United States Patent
McKedy et al.

(10) Patent No.: US 9,332,782 B2
(45) Date of Patent: May 10, 2016

(54) CONTROLLED RELEASE OF WATER TO AN OXYGEN SCAVENGER

(75) Inventors: George E. McKedy, Williamsville, NY (US); Chieh-Chun Chau, Victor, NY (US); Stanislav E. Solovyov, Getzville, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 809 days.

(21) Appl. No.: 12/778,629

(22) Filed: May 12, 2010

(65) Prior Publication Data

US 2011/0278499 A1 Nov. 17, 2011

(51) Int. Cl.
| | | |
|---|---|---|
| C09K 15/04 | (2006.01) |
| B65D 85/00 | (2006.01) |
| A23L 3/3436 | (2006.01) |
| B01J 20/30 | (2006.01) |
| B01J 20/34 | (2006.01) |
| B01J 20/02 | (2006.01) |
| B01J 20/28 | (2006.01) |

(52) U.S. Cl.
CPC ............ *A23L 3/3436* (2013.01); *B01J 20/0229* (2013.01); *B01J 20/2805* (2013.01); *B01J 20/3085* (2013.01); *B01J 20/3433* (2013.01)

(58) Field of Classification Search
CPC . A23L 3/3436; B01J 20/0229; B01J 20/2805; B01J 20/3435; B01J 20/3085; B01J 20/3433; Y10T 428/1352
USPC ......................... 428/35.7; 95/138; 252/158.25; 206/524.6
See application file for complete search history.

(56) References Cited

U.S. PATENT DOCUMENTS

| | | | |
|---|---|---|---|
| 4,795,714 A * | 1/1989 | Shafer ........................ 436/183 |
| 5,143,763 A * | 9/1992 | Yamada et al. .............. 428/36.2 |
| 5,207,943 A | 5/1993 | Cullen et al. |
| 5,262,375 A | 11/1993 | McKedy |
| 5,928,560 A | 7/1999 | DelDuca et al. |
| 6,315,921 B1 | 11/2001 | DelDuca et al. |
| 6,331,333 B1 * | 12/2001 | Wu et al. .................... 428/35.7 |
| 6,395,195 B1 | 5/2002 | Evans et al. |

(Continued)

FOREIGN PATENT DOCUMENTS

| | | |
|---|---|---|
| EP | 2077237 | 7/2009 |
| ES | 2226098 | 3/2005 |

(Continued)

OTHER PUBLICATIONS

Ramazani-Harandi et al.: Journal of Applied Polymer Science—May 8, 2009 (2 pages).

(Continued)

*Primary Examiner* — Gwendolyn Blackwell
*Assistant Examiner* — Kevin Ortman, Jr.
(74) *Attorney, Agent, or Firm* — Lee & Hayes, PLLC

(57) ABSTRACT

The invention relates to an article for oxygen absorption that is a container containing a water-soluble on source, a water activated oxygen scavenger, and a rupturable canister of hydrated polymer. The hydrated polymer comprises a superabsorbent polymer. The water-soluble on source comprises a salt. The invention in another embodiment relates to a method for providing timed oxygen absorption using the article as above with rupturing of the canister to release the water carrying superabsorbent such that it will contact the oxygen scavenger and on source thereby leading to activating the oxygen scavenger.

19 Claims, 4 Drawing Sheets

(56) References Cited

U.S. PATENT DOCUMENTS

| | | | |
|---|---|---|---|
| 6,458,877 B1 * | 10/2002 | Ahmed et al. | 524/275 |
| 6,508,955 B1 | 1/2003 | DelDuca et al. | |
| 6,666,988 B2 | 12/2003 | DelDuca et al. | |
| 6,667,273 B1 | 12/2003 | Cullen et al. | |
| 6,899,822 B2 | 5/2005 | McKedy | |
| 6,926,846 B1 | 8/2005 | DelDuca et al. | |
| 6,964,796 B1 * | 11/2005 | Koyama et al. | 428/34.1 |
| 7,147,799 B2 | 12/2006 | DelDuca et al. | |
| 2002/0006522 A1 | 1/2002 | Wu et al. | |
| 2004/0094745 A1 | 5/2004 | McKedy | |
| 2005/0072958 A1 | 4/2005 | Powers | |
| 2005/0205841 A1 | 9/2005 | McKedy | |
| 2005/0224751 A1 * | 10/2005 | DelDuca et al. | 252/188.28 |
| 2006/0096468 A1 * | 5/2006 | Paine | 99/473 |
| 2007/0020456 A1 | 1/2007 | Solovyov | |
| 2007/0163917 A1 | 7/2007 | Friesen et al. | |
| 2010/0025629 A1 | 2/2010 | Powers et al. | |

FOREIGN PATENT DOCUMENTS

| | | | | |
|---|---|---|---|---|
| FR | 2902104 | | 12/2007 | |
| JP | H04244229 | | 9/1992 | |
| JP | H08500280 | | 1/1996 | |
| JP | 2001-040350 | * | 2/2001 | C09K 15/02 |
| WO | WO9212004 | | 7/1992 | |
| WO | WO9513135 | | 5/1995 | |
| WO | WO0028839 | | 5/2000 | |
| WO | WO03065821 | | 8/2003 | |

OTHER PUBLICATIONS http://www.foodadditivesworld.com/thickeners-and-vegetables-gums website Dec. 11, 2009 (2 pages).

High Technology on CO2 Absorption . . . Medical: http://www.atrasorb.com.br/index.php website—May 4, 2010 (2 pages).

High Technolgy on CO2 Absorption . . . Underwater: http://www.atrasorb.com.br/index.php website—May 4, 2010 (2 pages).

PCT—Notification of Transmittal of the International Search Report and the Written Opinion of the International Authority, or the Declaration; dated Jan. 2, 2012 in corresponding PCT International Application No. PCT/US2011/029724 (2 pages).

PCT—International Search Report dated Jan. 2, 2012 in corresponding PCT International Application No. PCT/US2011/029724 (3 pages).

PCT—Written Opinion of the International Searching Authority dated Jan. 2, 2012 in corresponding PCT International Application No. PCT/US2011/029724 (3 pages).

Superabsorbent polymer: Wikipedia (5 pages) http:en.wikipedia.org/wiki/Superabsorbent_polymer—dated Nov. 3, 2012.

Polyvinylpyrrolidone: Wikipedia (5 pages) http:en.wikipedia.org/wiki/Polyvinylpyrrolidone—dated Nov. 3, 2012.

The Extended European Search Report mailed Nov. 26, 2013 for European patent application No. 11780968.1, 11 pages.

Translated the Japanese Office Action mailed Oct. 7, 2014 for Japanese patent application No. 2013-510094, a counterpart foreign application of U.S. Appl. No. 12/778,629, 4 pages.

Translated the Colombian Office Action mailed May 30, 2014 for Colombian patent application No. 12-222523, a counterpart foreign application of U.S. Appl. No. 12/778,629, 18 pages.

Translated the Chinese Office Action mailed Dec. 12, 2014 for Chinese patent application No. 201180034587.2, a counterpart foreign application of U.S. Appl. No. 12/778,629, 27 pages.

Wu, et al., "Chapter IV the structure of super absorbents and the theory of absorption, Super absorbents", Chemical Industry Press, Mar. 30, 2005, pp. 100-133.

The Chilean Office Action mailed Jan. 15, 2015 for Chilean patent application No. 3149-2012, a counterpart foreign application of U.S. Appl. No. 12/778,629, 8 pages.

The Australian Office Action mailed Oct. 29, 2014 for Australian patent application No. 2011253456, a counterpart foreign application of U.S. Appl. No. 12/778,629, 3 pages.

Translated the Chinese Office Action mailed Jul. 23, 2015 for Chinese patent application No. 201180034587.2, a counterpart foreign application of U.S. Appl. No. 12/778,629, 10 pages.

\* cited by examiner

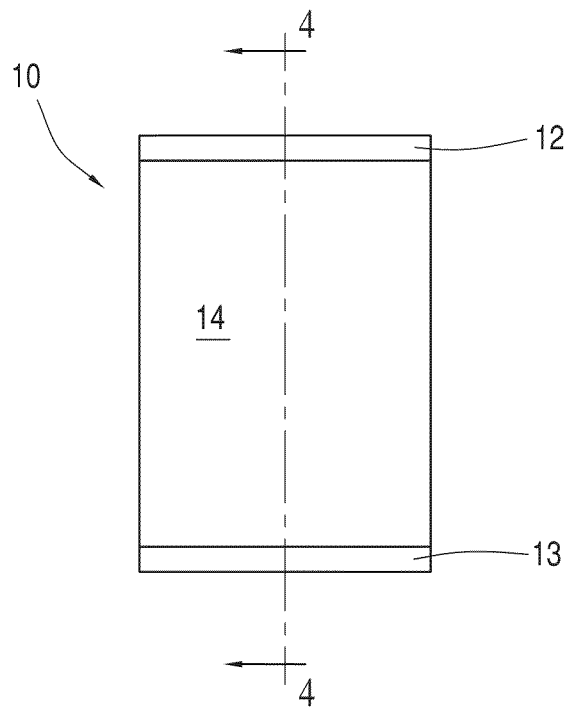
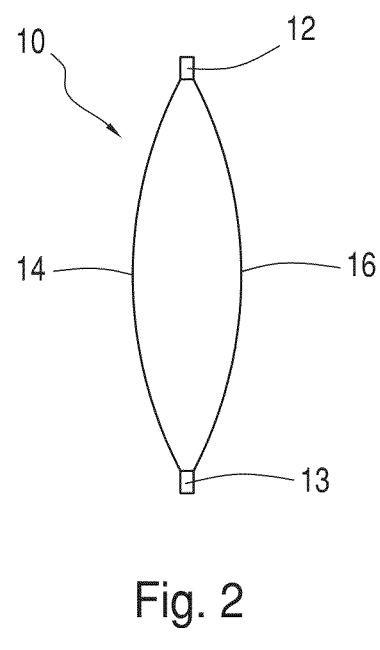
Fig. 1
Fig. 2
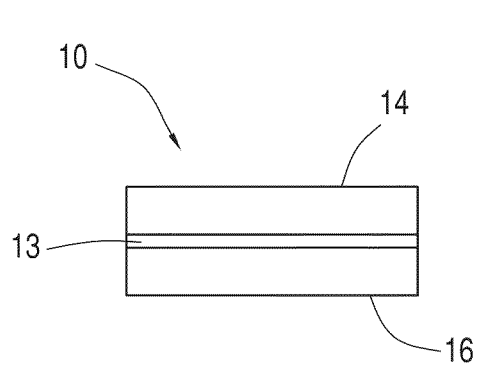
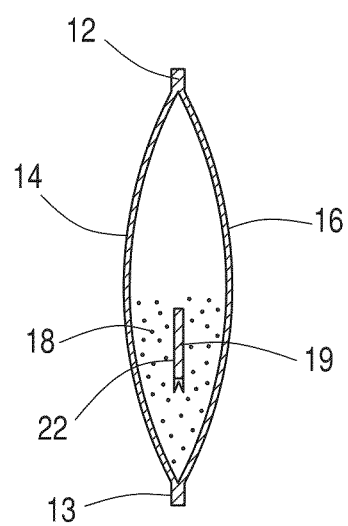
Fig. 3
Fig. 4

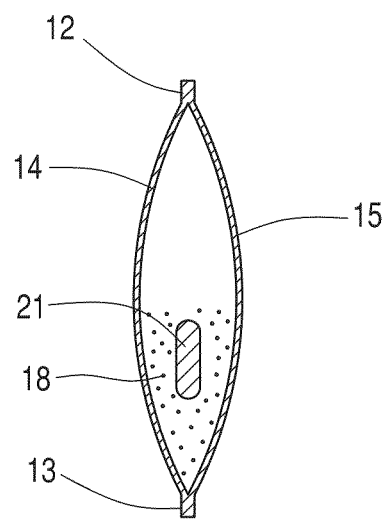
Fig. 5
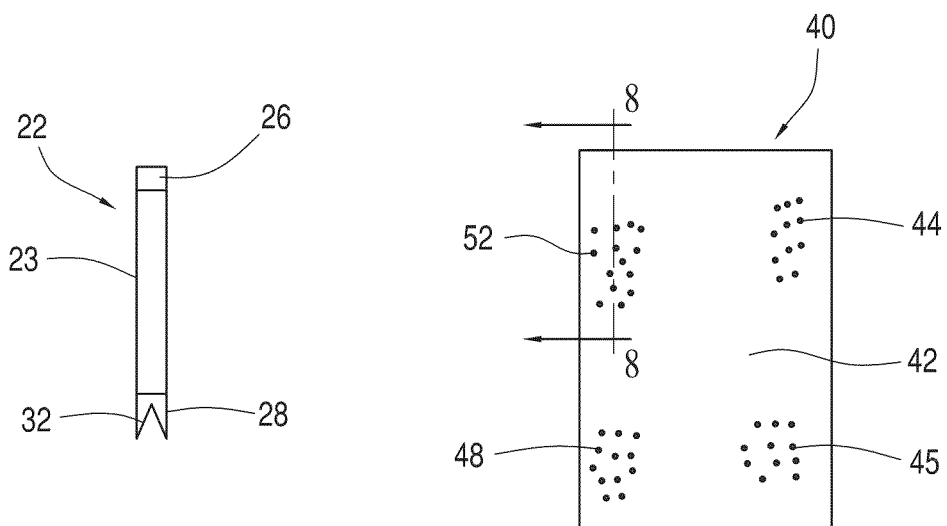
Fig. 6
Fig. 7

CONTROLLED RELEASE OF WATER TO AN OXYGEN SCAVENGER

BACKGROUND OF THE INVENTION

It has been known in the food and pharmaceutical arts to provide an oxygen scavenger in product packaging in order to prolong the usable life of the food or pharmaceutical. A difficulty with the utilization of oxygen scavengers that are transition metal based and activated by protic solvents such as water is that they must be kept inactive until the time of packaging by keeping them dry (usually below 50% RH) and then must be rapidly activated by contacting a water source. Activation by water vapor available from the product to be packaged in many instances is too slow to guarantee rapid deoxygenation of the package to protect an oxygen sensitive product. Another difficulty is that if the oxygen scavenger is in contact with water, but not in contact with significant oxygen, hydrogen may be generated, which is undesirable as the bags of oxygen adsorbent swell.

Iron based oxygen scavengers are used in packaging bags of packaged meat for long distance shipping and other retail meat packaging to extend the freshness of meat. Iron and other transition metal powders generally require a protic solvent (usually water) to trigger the oxygen scavenging process. Traditionally, this moisture is obtained from the ambient environment that the oxygen scavenger is placed in. However, there are instances where in oxygen absorber would be placed in a relatively dry environment, or it is desired to be fully active upon the point of insertion to provide the most efficient oxygen removal, as is the case in the meatpacking industry. In those instances, a moisture source is usually packaged with iron to accelerate the reaction. Inorganic salts (electrolytes, acidifying agents, etc.) are usually mixed with iron powder in order to promote oxidation reaction. Given the lack of oxygen (to protect its reactive capacity during scavenger storage), this process inevitably generates hydrogen gas via reaction of the metal with water, which is undesirable in the operation. On the other hand, while the addition of buffer systems to increase the pH of mixture and impede hydrogen formation could minimize the production of hydrogen gas, it inevitably results in slower scavenging rates which is undesirable. It is ideal to allow the scavenging reaction to take place at the time of food packaging to maximize the scavenging rate, to fully utilize its reactive capacity, and to prevent hydrogen formation.

One of the current methods involves the preparation of iron and salt blends and a moisture regulator in one mixture and vacuum packaging the sachets. A prior art described a method of water or salt solution injection into premixed packaged iron/salt composition. This approach involves a complicated setup of a water injection device for the scavenger packets and packaging master bags. The setup is often costly, prone to malfunction and not flexible to operational changes. Therefore, it is desirable to find a way to provide timely activation of the inactive scavenging composition to speed up the scavenging reaction at the time of scavenger use.

The DelDuca et al. U.S. Pat. Nos. 5,928,560, 6,315,921, 6,508,955, 6,666,988, 6,926,846, and 7,147,799 disclose a system for injecting an aqueous solution into a oxygen scavenging packet and a system for breaking a capsule containing an aqueous solution in an oxygen absorbing packet. Rapid uncontrolled release of an aqueous solution into a scavenging formulation given low oxygen environment during packaging operations often results in hydrogen gas formation.

There remains a need for a method of preventing early hydrogen formation in oxygen absorbers utilizing water activated oxygen scavengers.

FIELD OF THE INVENTION

The invention relates to oxygen scavenging utilizing an water activated oxygen scavenger. The invention provides controlled release of water to the water activated oxygen scavenger.

BRIEF SUMMARY OF THE INVENTION

The invention provides an article for oxygen absorption comprising a container containing a water-soluble ion source, an water activated oxygen scavenger, and a rupturable canister of hydrated polymer.

The invention provides in another embodiment a method for providing timed or controlled oxygen absorption comprising providing an article for oxygen absorption comprising a container containing a water-soluble ion source, an water activated oxygen scavenger, and a rupturable canister of hydrated polymer, rupturing the canister, whereby the hydrated polymer and water-soluble ion source come in contact and release water, and the water as it is released activates the oxygen scavenger.

BRIEF DESCRIPTION OF THE SEVERAL VIEWS OF THE DRAWING(S)

FIG. 1, FIG. 2, and FIG. 3 are top, side, and end views of an oxygen scavenging article in accordance with the invention.

FIG. 4 is a cross-sectional view of the article of the invention on cross-sectional line 4-4 of FIG. 1.

FIG. 5 is a cross-sectional view of an alternative article of the invention.

FIG. 6 is a view of a canister utilized in the invention.

FIG. 7 and FIG. 8 are the top and cross-sectional view on line 8-8 of a sheet suitable for forming an article of the invention.

DETAILED DESCRIPTION OF THE INVENTION

Figure 8:
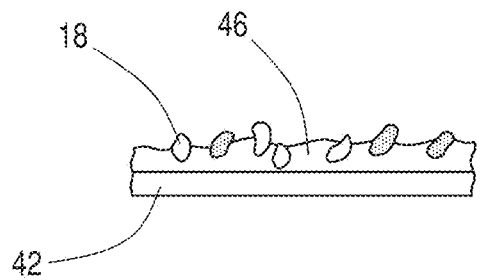
Figure 9:
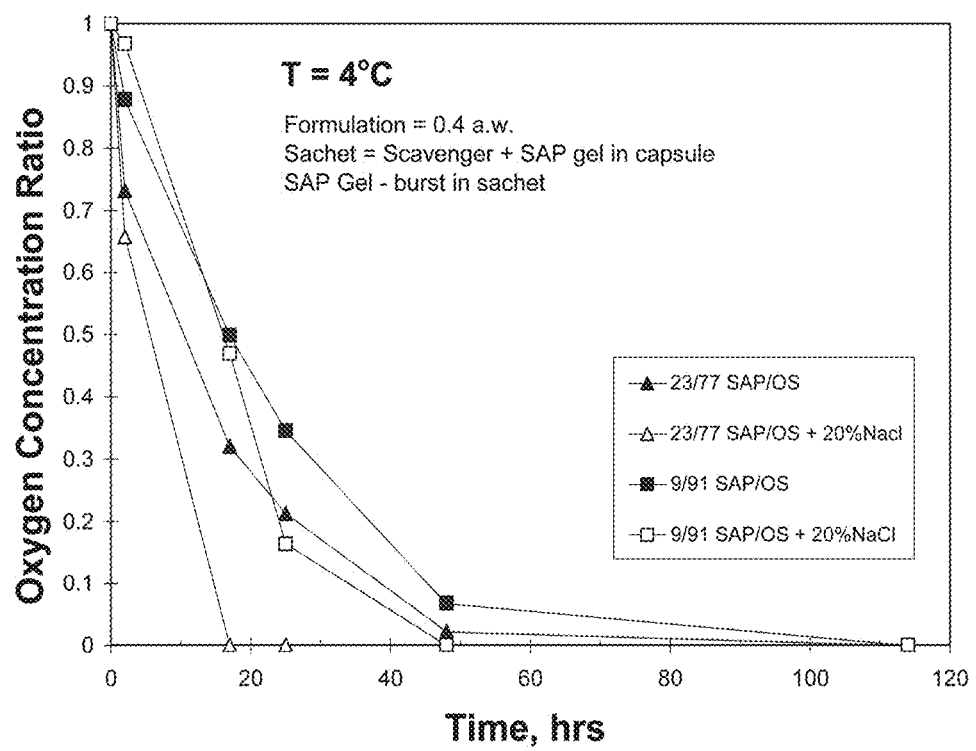
FIG. 9 is a comparison of oxygen scavenging ratio vs. time for samples of different SAP gel and NaCl contents.

The invention has numerous advantages over prior oxygen scavenging articles. The delayed or timed release of water in contact with the oxygen scavenging material creates advantages. In this invention, a method is disclosed to provide a controlled activation of the oxygen scavenger. The method provides for a two compartment design of an oxygen scavenging article. The dry iron or other metal powder (oxygen scavenger) and salt (ion source) mixture is packaged in a container without moisture sources, and the moisture source is packaged in a separate canister in the container. Specifically, the moisture source is not liquid water, rather it is a solid that can generate liquid water in a controlled manner upon contact with the ion source material. Solids comprising immobilized colloidal particle suspensions or cross-linked polymer systems with essentially all aqueous solvent bound within its structure are commonly referred as hydrogels or simply gels. By using an embedded solid to generate liquid water, the complexity of water injection at the time of insertion in a package can be avoided. By using a two compartment design of the article, the oxidation reaction can be triggered and scavenging rate maximized as soon as needed. And as an additional benefit, the hydrogen gas formation can be minimized and generally is prevented.

There are numerous advantages in using the two compartment (container and canister) approach. The water triggerable scavenging composition is kept inactive by preparing and keeping it dry at below approximately 50% RH until use. Liquid water needed for activation is not present in the package before activation, it is generated by built-in design, and there is no need for an injection device. A controlled accelerated scavenging rate is achieved at the time of activation. Controlled activation and oxidation rates minimizes hydrogen gas formation.

FIG. 1, FIG. 2, and FIG. 3, are top, side, and end views of an article 10 in accordance with the invention. The article has sides 14 and 16 that are sides of a tube that is sealed at 12 and 13. The sealing to close the water impervious but oxygen pervious fabric tube is usually a heat sealing, although it may be adhesively sealed. The sealed tube 10 contains oxygen absorbent and ion source particulate materials 18 and a rupturable canister 19 of hydrated polymer 22.

FIG. 5 is an alternative cross-sectional view where the rupturable canister is shown as a brittle capsule 21 containing hydrated polymer. FIG. 6 is a view of the rupturable tube canister 23. The tube 23 is formed of a polymer that is deformable. The tube is heat sealed at the ends by seals 26 and 28. The tube is provided with a notch 32 in the end seal 28, which is a point of weakness where the tube 22 will rupture when compressed. Although the notch 32 is shown in the end of seal 28, it should be appreciated that the notch 32 or point of weakness can be located along any portion of the tube and that a plurality of notches or other points of weaknesses can be included.

FIGS. 7 and 8 show a sheet 40 that has an alternative structure for use in forming the container of the article of the invention. The sheet 40 comprises an oxygen permeable and essentially water impermeable fabric or sheet 42. In areas 44, 45, 48, and 52, there are applied ion source and oxygen absorbent particles 18 in an adhesive 46. The sheet 40 could be used as one or both sides of an article of the invention. When these sheets are used in container formation, the rupturable canister would only contact the oxygen absorbent materials and ion source on the part of the sheet adjacent to the rupturable canister. This contact would allow the ion source to contact the gel. The ion source contacting the gel will release water as the superabsorbent cannot absorb and hold as much ion containing water. As water is released from the canister as the adjacent ion source becomes available to the hydrated polymer in the canister, the initially released water contacts the more distant portions of the oxygen absorbing materials and activates these materials. This provides a controllable water release so as not to release hydrogen, but still provide almost immediate oxygen absorption. In an embodiment of the invention, not shown, the canister 23 is located in the center of a container formed of the materials of FIGS. 7 and 8. In another embodiment of the invention, not shown, the canister is adhered to one end of a container formed from the FIGS. 7 and 8 materials. Different locations of the canister 23 will result in different rates of water release to the oxygen scavenger.

Use of water to accelerate oxidation of iron and other transition metals is well known from basic chemistry, but little was known about designing and applying controlled or timed water-releasing mechanism from solid materials to control metal oxidation.

This invention discloses a method that gives simple and controlled activation for oxygen scavenger in display case meat packaging or other oxygen scavenger packaging. This method utilizes a behavior that superabsorbent polymer gels possess above a certain degree of saturation with pure water. When such a superabsorbent polymer gel is contacted by inorganic salt such as NaCl, the gel of superabsorbent polymer spontaneously breaks down and releases much of the liquid water that is being held in the gel. Another way of describing this process is the empirical fact that equilibrium saturation capacity of the gel for a concentrated salt solution is usually much lower than its capacity to hold pure water. Different salt solutions possess different gel saturation capacities. When a dry salt is contacted by the gel and it starts to dissolve at the contact interface, the gel capacity to keep salted water immobilized within its structure is reduced. As a result, liquid water is released from solid gel in a controlled manner.

A superabsorbent polymer (SAP) gel (even at high concentrations of absorbed water which is immobilized within the gel) is a solid structure that can be characterized by the non-flowing behavior and three dimensional structure as described in "Rheological Determination of the Swollen Gel Strength of Superabsorbent Polymer Hydrogels", Polymer Testing, 25, 470 (2006). The structure of SAP gel is described in publications such as "Micromorphology of macromolecular superabsorbent polymer and its fractal characteristics" in J. Appl. Polym. Sci., 113, 6, 3510 (2009), and "Effects of structural variables on AUL and rheological behavior of SAP gels" in J. Appl. Polym Sci., 113, 3676, (2009). The SAP gel is a solid as characterized by its elastic modulus as described in "Determination of the Elastic Modulus of Superabsorbent Gel Beads" in Polymer Gels and Networks, 5, 107 (1997). The gel structure is characteristic of a solid, and is distinctly different from liquid that has a low viscosity and does not have a crystalline structure. While some water can be released from the gel by application of hydrostatic pressure, this water will be reabsorbed when the pressure is relieved. Water release upon gel contact with the dry salt mixture is permanent and this water becomes available for activation of metal based oxygen scavenging composition.

By using this method, the reactive capacity of the scavenger article can be maintained before use, the oxygen scavenging rate is properly controlled, and the spontaneous oxidation can be triggered since as soon as the SAP is in contact with the salt, it starts to release water.

The invention utilizes a material that is a water-releasing solid such as superabsorbent polymer gel that can be decomposed upon contacting with an inorganic salt. The superabsorbent polymer gel is a solid material that can be made into a desirable form and shape.

The preferred oxygen scavenger article of the of the invention provides a design that has a canister containing SAP gel and is located in a container that contains a mixture of at least an iron based oxygen scavenger and a salt that can help disperse the iron based oxygen scavenger. The invention provides a method to generate water in the container. The method is to allow the superabsorbent polymer gel to break down in the presence of salt to release water. A method of doing that is by breaking the container open to allow the gel to be in contact with the surrounding salt and the oxygen scavenger in the article.

The container of the invention may be any suitable material that will allow the passage of oxygen into the container but not allow the escape of the oxygen scavenger material or water. Typical of such materials are the essentially liquid water impermeable but gas permeable non-woven fabrics and polyolefin films, such as those sold under the trademarks Tyvek and Valeron. The container only needs a portion to be made of the gas permeable material. For example, the container may be a pouch in which only one wall is gas permeable.

The hydrated polymer of the invention may be any polymer material that will absorb a significant amount of water when compared with its own weight, form a solid gel where all absorbed water is bound in a crystalline structure, and release that water when it is brought into contact with an ion source. Typical of such materials are agarose, methylcellulose, various natural gums, alginates and other natural organic gel-forming absorbents. Suitable materials have been found to be from the class of polymers known as superabsorbent polymers (SAP). SAP gel-forming articles can be prepared from highly polar hygroscopic polymers or lightly crosslinked polymers of sodium and other polyacrylate polymers and copolymers, polyacrylic acid, polyvinyl alcohols, polyvinylpyrrolidone, polyacrylamide, sodium polyacrylate branched-homopolymer, polyethylene oxide, bio-derived polymers and their copolymers or derivatives. Typically water soluble polymers with some level of crosslinking can serve the purpose. For polyacrylic acid, the gel structure can be formed by dissolving between about 0.5 to 5 gm, preferably 1 to 3 gm, of the material in 50 ml water. The SAP gel content with respect to iron in the invention is preferably 5/95 by weight, more preferably 10/90 and most preferably 20-30% gel to 70-80% by weight iron. The preferred SAP is acrylate-acrylamide co-polymer because it rapidly releases water in the presence of salt.

The ion source may be any water-soluble material that will generate ions that decrease the water holding ability of the hydrated polymer. These materials are typically inorganic or organic salts. The preferred salt can be any inorganic salt such as sodium, potassium or calcium based ionic compounds that are soluble in water. Typical examples include NaCl, KCl, and $Na_2HPO_4$ and others. NaCl is preferred as it is effective, safe and low in cost. A mixture of separate electrolytic and acidifying salt components can be advantageously used in the formulation as described in prior art. An example of acidifying salt is sodium bisulfate.

The oxygen scavenger may be any suitable material that is activated by water. Typically the oxygen scavenger would be a transition metal powder such as iron, zinc, manganese, copper, and others known from prior art. A preferred oxygen scavenger is reduced iron powder. The iron based oxygen scavenging materials can be any type used in the prior art including those described in U.S. Pat. No. 6,899,822, US Pat. Application Nos. 2005/0205841 and 2007/020456, all to Multisorb Technologies Inc., incorporated in their entirety by reference. The current invention is particularly focused on preferred iron-based powders with a mean particle size of 1-100 um, where iron particles are mixed and/or pre-coated with activating and oxidation reaction promoter particles to form a homogeneous powder made up of heterogeneous particles. This way each particle contains all necessary components for efficient oxygen scavenging except water.

The types of iron that can be used are hydrogen reduced iron, especially sponge grade hydrogen reduced iron, annealed electrolytically reduced iron and carbonyl iron. The hydrogen reduced sponge grade iron is preferred because it has been found that it functions significantly better than other irons. It is believed that this better functioning is due to the fact that the sponge grade hydrogen reduced iron has a much larger surface area per unit weight because the surface is larger than the surface of annealed electrolytically reduced iron which is spherical. However, other types of iron including but not limited to non-annealed electrolytically reduced iron can also be used in addition to the various irons noted above.

In a preferred composition comprising iron, sodium bisulfate and sodium chloride, the iron may be present by weight in an amount of between about 50% and 98%, and more preferably between about 75% and 95%, and most preferably between about 80% and 90%.

The majority of the iron may have a size of between about 150 microns and 1 micron, and more preferably between about 100 microns and 5 microns, and most preferably between about 50 microns and 5 microns.

The sodium bisulfate may be present by weight in an amount of between about 1% and 30%, and more preferably between about 4% and 20%, and most preferably between about 5% and 18% of the iron by weight.

The majority of the sodium bisulfate may have a size of between about 150 microns and 1 micron, and more preferably between about 100 microns and 5 microns, and most preferably between about 50 microns and 5 microns. However, if desired, the sodium bisulfate or any other acidifier may be applied as a solution to the iron and the solvent can then be removed, leaving a deposit of the acidifier on the iron.

While sodium bisulfate is the preferred acidifier in the composition, potassium bisulfate has been found to function satisfactorily. Also, other acids and acid salts will function satisfactorily as the acidifier. These may include, without limitation, fumaric acid, sodium diacetate, citric acid and sodium salt of acetic acid. These other acidifiers may be of the same size ranges and be used in the relative proportions with respect to the sodium bisulfate, depending on their relative molecular weights and acidity.

The sodium chloride, which is the preferred electrolyte, may be present by weight in an amount of at least about 0.1% provided that it is mixed well enough with the other components to produce the desired electrolytic action, and more preferably between about 0.5% and 4%, and most preferably between about 1% and 3%. As a practical matter, only a minimum amount of salt is necessary to produce the desired electrolytic action, and any excess salt merely takes the place of iron which actually reacts with the oxygen.

The canister that holds the hydrated polymer may be formed of any material that will contain the hydrated material without allowing leakage or access of the ion source to the interior of the canister. The canister may be a frangible capsule that may be crushed or bent to break in order to provide access for the ion source to the hydrated polymer. The canister further could be a sealed polymer tube that is provided with at least one point of weakness such that when the tube has pressure applied to it an opening develops where the ion source can generate water when it has access to the hydrated polymer. It is contemplated that the rupturable canister may be of any shape and material that will allow it to be compressed or deformed to form an opening where of the ion source can contact the hydrated polymer. Any shape may be used including a pouch, tube, capsule, or box. The canister may be rigid, pliable, or soft, such as a pouch formed of polymer sheets. A preferred rupturable canister comprises a flexible plastic tube sealed at both ends that is either frangible, or perforated in such a way to allow communication between the gel and the oxygen absorbing composition after pressure is applied to the canister. An equally preferable rupturable canister comprises four sided sealed pouch, wherein the gel is either extruded or deposited in a matrix on the bottom web, a top web is then placed over it and sealed to the bottom web, and then the descrete pockets are slit and cut from the web to form distinct packs of a flexible plastic or printed gel square sealed between two flexible plastic sheets to form a pouch: because of ease of filling these canisters with solid gel via dispensing extruded gel into a tube. In another embodiment, there is diecutting and printing a gel square onto a flexible sheet, and subsequently encapsulating them in a rupturable canister. The control of rupture is preferably achieved by creating a notch or score of a suitable length in the flexible encapsulating canister.

The amount of water in the canister is any amount sufficient to activate the oxygen scavenger material. Typically, the weight ranges of iron to water is 10-30% water weight to 90-70% by iron weight. Release of even a fraction of this water as a liquid serves as a much more efficient means to activate the scavenger compared to activation by water vapor from the environment.

Although not set forth in detail, it is also possible that one of several known additives are present in the container or canister. The materials include bacteriastats, fungicides, colorants, and fragrances that are known for use with oxygen absorbers.

While the invention has been described with a preferred use in the packaging of foods such as meat and vegetables, the article would also find uses in other areas. There's a need for oxygen scavenging when packaging certain pharmaceuticals. It is also is a need for oxygen absorption when packaging certain rapid oxidizing materials such as explosives and fine metal particles.

The following Examples are not intended to be exhaustive of the embodiments encompassed by this invention. Parts and percentages are by weight unless otherwise indicated.

EXAMPLE 1

SAP Gel Preparation

Polyacrylic acid based SAP (Wasterlock 770) was obtained from M2 Polymer. Two grams of the polymer in granular form was dissolved in 100 gm of water to form gel. The gel particle has a size of approximately 1-4 mm. The gel particles were packed loosely and removed by spoons. The gel with a chosen weight was put in a ¼" (diameter)×1.5" plastic tubing. The tubing was hot sealed at both ends to have the gel enclosed in the tubing.

Oxygen Scavenging Packet and Test Method

An oxygen scavenger formulation was prepared by mixing iron particulates of 5-50 um with sodium chloride powder with a weight ratio of approximately 97 iron/3 sodium chloride to form a homogeneous powder mixture. Silica gel in about 1% by weight was added in the mixture as an additive. The formulation was pre-moisturized to maintain approximately 0.4 water activity. Approximately 5 gm of the oxygen scavenging formulation was packaged in a porous polyethylene sachet container. A ¼" polyethylene plastic tubing containing 0.5 or 1.5 gm of the SAP gel was also put in the sachet. The tubing was provided with weak areas made by scoring cuts around the circumference of the tube at three spaced areas on the length of the tube. Optionally, see Table 1, additional NaCl was added to the sachet container to help speed up gel breakdown and water release.

Prior to the beginning of the test, the SAP gel canister was compressed by a weight device such that the tube canister was flattened. The gel was released into the container through the openings created in the canister by flattening. The sachet container was then sealed in a barrier plastic bag containing 3 to 3.5 liter of a gas mixture of $O_2/CO_2/N_2$=1/30/69 ratio. The oxygen concentration at 4° C. was measured by using MOCON PacCheck Model 450 Head Space Analyzer over time.

Oxygen Scavenging Performance

The oxygen absorption performance is shown in Table-1 for two levels of SAP gel contents and NaCl contents. The variation of the ratio of the oxygen content with respect to the starting oxygen content with time was plotted in FIG. 1 for two levels of SAP gel and NaCl contents. The oxygen concentration decreased rapidly with time for all the samples. The rate of decrease is larger for the higher loading of SAP gel sample. It is also larger for samples with a higher loading of the NaCl content. This observation demonstrated the effectiveness of SAP gel in accelerating oxygen scavenging.

TABLE 1

Oxygen scavenging properties of SAP gel sachet samples

| Oxygen scavenger formulation Wt, gm | SAP Gel Wt, gm | Extra NaCl Wt, gm | Gas mix vol, cc | Temp ° C. | Time hrs | Concentration O2, % | Ratio |
| --- | --- | --- | --- | --- | --- | --- | --- |
| 5 | 1.5 | 0 | 3000 | 4 | 0 | 2.95 | 1.00 |
|   |     |   |      |   | 2 | 2.16 | 0.73 |
|   |     |   |      |   | 17 | 0.95 | 0.32 |
|   |     |   |      |   | 25 | 0.63 | 0.21 |
|   |     |   |      |   | 48 | 0.07 | 0.02 |
|   |     |   |      |   | 114 | 0.00 | 0.00 |
| 5 | 1.5 | 1 | 3000 | 4 | 0 | 1.45 | 1.00 |
|   |     |   |      |   | 2 | 0.95 | 0.66 |
|   |     |   |      |   | 17 | 0.00 | 0.00 |
|   |     |   |      |   | 25 | 0.00 | 0.00 |
|   |     |   |      |   | 48 | 0.00 | 0.00 |
|   |     |   |      |   | 114 | 0.00 | 0.00 |
| 5.1 | 0.5 | 0 | 3000 | 4 | 0 | 2.95 | 1.00 |
|   |     |   |      |   | 2 | 2.59 | 0.88 |
|   |     |   |      |   | 17 | 1.47 | 0.50 |
|   |     |   |      |   | 25 | 1.02 | 0.35 |
|   |     |   |      |   | 48 | 0.20 | 0.07 |
|   |     |   |      |   | 114 | 0.00 | 0.00 |

TABLE 1-continued

Oxygen scavenging properties of SAP gel sachet samples

| Oxygen scavenger formulation Wt, gm | SAP Gel Wt, gm | Extra NaCl Wt, gm | Gas mix vol, cc | Temp °C. | Time hrs | Concentration O2, % | Ratio |
|---|---|---|---|---|---|---|---|
| 5 | 0.5 | 1 | 3000 | 4 | 0 | 1.54 | 1.00 |
|   |   |   |   |   | 2 | 1.49 | 0.97 |
|   |   |   |   |   | 17 | 0.72 | 0.47 |
|   |   |   |   |   | 25 | 0.25 | 0.16 |
|   |   |   |   |   | 48 | 0.00 | 0.00 |
|   |   |   |   |   | 114 | 0.00 | 0.00 |

EXAMPLE 2

Comparison Between SAP Gel and Water Injection

Figure 10:
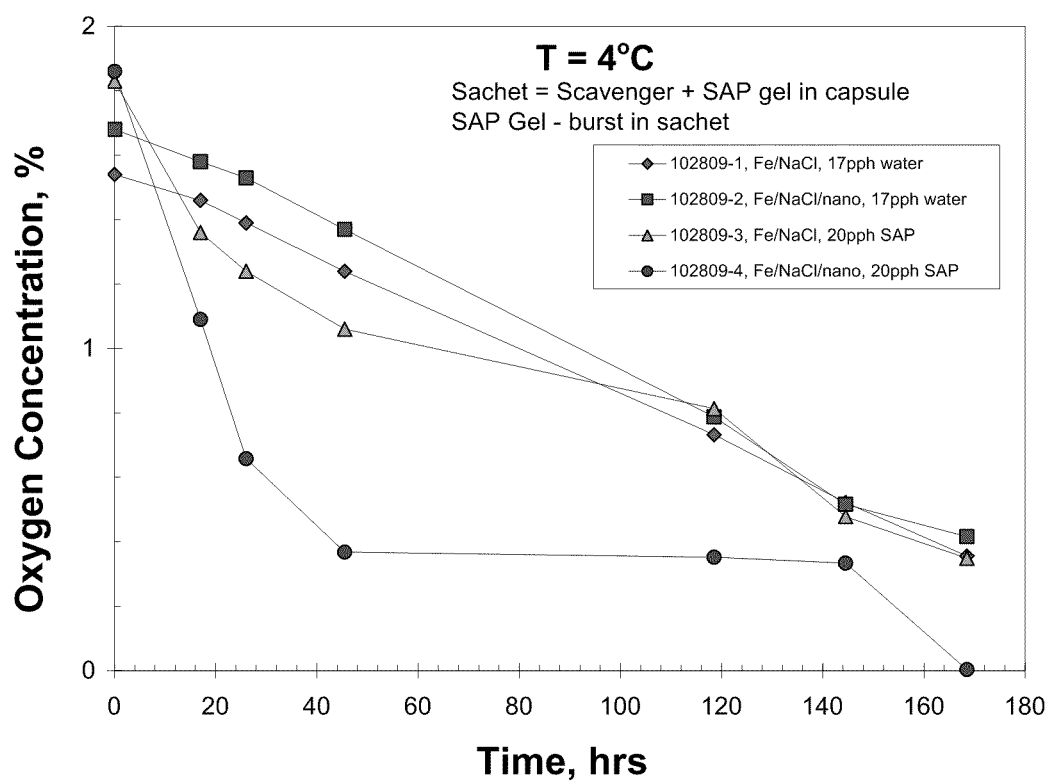
FIG. 10 is a comparison of oxygen scavenging behavior for samples activated by water injection and SAP gels.

Five grams of iron was mixed with 2 gm of NaCl. Another sample of the same mixture was blended with 1.3 gm of clay (Southern Clay Cloisite 20A). The mixtures were packaged in two separate sachets containers and injected with 1.2 cc of water prior to start of the oxygen absorption test. A separate sample article was made by mixing 5 gm iron and 2 gm NaCl in a sachet container with a ¼" plastic tubing canister that contained 1.4 gm of SAP gel. Another sample was made by using the same formula with addition of 1.3 gm of clay (Southern Clay Cloisite 20A). The tubing canister was broken by using the same method as Example 1 prior to the absorption test. The results of the oxygen absorption from 3500 cc gas mixture is shown in FIG. 10. The results showed that with the SAP gel, the initial oxygen absorption rate was comparable to or faster than that of water injection. The use of clay made slight difference in the oxygen scavenging rate for the SAP gel sample.

The invention claimed is:

1. An article for oxygen absorption comprising:
   a container;
   a salt disposed in the container;
   a water activated oxygen scavenger disposed in the container;
   a rupturable canister disposed in the container; and a solid, non-flowing, hydrated superabsorbent polymer gel that releases liquid water upon contact with the salt in the container,
   wherein rupturing the canister of hydrated superabsorbent polymer gel causes the hydrated superabsorbent polymer gel to contact the salt disposed in the container and release water from the hydrated superabsorbent polymer gel.

2. The article of claim 1, wherein the container comprises a sachet.

3. The article of claim 1, wherein the release of water will not result in hydrogen release.

4. The article of claim 1, wherein the hydrated superabsorbent polymer comprises an acrylate-acrylamide copolymer.

5. The article of claim 1, wherein the hydrated superabsorbent polymer comprises a lightly cross-linked polyacrylate copolymer.

6. The article of claim 3, wherein a portion of the oxygen scavenger is not immediately available to the released water.

7. The article of claim 1, wherein the salt and the water-activated oxygen scavenger are mixed prior to placement in the container.

8. The article of claim 1, wherein the container is water impervious and oxygen pervious.

9. The article of claim 1, wherein the rupturable canister comprises a brittle capsule.

10. The article of claim 9, wherein the rupturable canister comprises a tube formed of a deformable polymer.

11. The article of claim 9, wherein the rupturable container comprises at least one point of weakness at which the rupturable container will rupture when compressed.

12. The article of claim 11, wherein the at least one point of weakness comprises a notch.

13. The article of claim 1, wherein the container is formed from a sheet and areas of the sheet include the salt and the water-activated oxygen scavenger.

14. The article of claim 13, further comprising an adhesive for securing the salt and the water-activated oxygen scavenger to the areas of the sheet.

15. An oxygen scavenging article comprising:
   a sealed water impermeable and oxygen permeable container;
   a mixture comprising an iron-based oxygen absorber and an ion source disposed in the container; and
   a rupturable canister containing hydrated superabsorbent polymer that releases water upon contacting the ion source in the container, wherein rupturing the rupturable canister causes the hydrated superabsorbent polymer to contact the ion source.

16. The oxygen scavenging article of claim 15, wherein the ion source comprises a salt.

17. The oxygen scavenging article of claim 15, wherein the hydrated superabsorbent polymer is solid and non-flowing.

18. The oxygen scavenging article of claim 15, wherein the container is formed from a sheet and areas of the sheet include the mixture.

19. The oxygen scavenging article of claim 18, further comprising an adhesive for securing the mixture to the sheet at the areas of the sheet.

* * * * *